US006899372B1

(12) United States Patent
Keller

(10) Patent No.: US 6,899,372 B1
(45) Date of Patent: May 31, 2005

(54) PICKUP BED COVER

(76) Inventor: William Bruce Keller, 2214 Chisholm Dr., Duncan, OK (US) 73533

( * ) Notice: Subject to any disclaimer, the term of this patent is extended or adjusted under 35 U.S.C. 154(b) by 0 days.

(21) Appl. No.: 10/891,398

(22) Filed: Jul. 14, 2004

(51) Int. Cl.$^7$ .................................................. B60P 7/02
(52) U.S. Cl. ........................... 296/100.09; 296/100.06; 296/100.1
(58) Field of Search ....................... 296/100.06, 100.07, 296/100.1, 100.09; 160/32, 35, 84.01, 84.02, 160/84.03, 84.08

(56) References Cited

U.S. PATENT DOCUMENTS

| 4,252,362 | A |   | 2/1981  | Campbell       |            |
|-----------|---|---|---------|----------------|------------|
| 4,313,636 | A |   | 2/1982  | Deeds          |            |
| 4,418,954 | A | * | 12/1983 | Buckley        | 296/100.09 |
| 5,427,428 | A | * | 6/1995  | Ericson et al. | 296/98     |
| 5,636,893 | A | * | 6/1997  | Wheatley et al.| 296/100.07 |
| 5,653,491 | A | * | 8/1997  | Steffens et al.| 296/100.09 |
| 6,095,588 | A | * | 8/2000  | Rodosta        | 296/100.09 |
| 6,129,407 | A | * | 10/2000 | Kooiker        | 296/100.07 |
| 6,533,344 | B1|   | 3/2003  | Patterson      |            |
| 6,565,141 | B1| * | 5/2003  | Steffens et al.| 296/100.07 |
| 6,616,210 | B1| * | 9/2003  | Massey         | 296/100.1  |
| 6,824,190 | B1| * | 11/2004 | Rogers         | 296/100.09 |

* cited by examiner

Primary Examiner—Stephen Gordon
(74) Attorney, Agent, or Firm—James T. Robinson

(57) ABSTRACT

A cover for the bed of a pickup truck provides a front rigid panel fastened to the front wall of the pickup bed, at least one intermediate rigid panel attached to the front rigid panel by a first transverse hinge, and a rear rigid panel attached to the intermediate rigid panel by a second transverse hinge. The rear rigid panel has a tailgate locking lip flaring downwardly and outwardly to prevent the tailgate from opening. In the fully covering position, the pickup bed cover provides a water-resistant, locked cargo area. In the partially covering position, the rear rigid panel and, optionally, the intermediate rigid panel fold forward to permit access to the cargo bed.

6 Claims, 7 Drawing Sheets

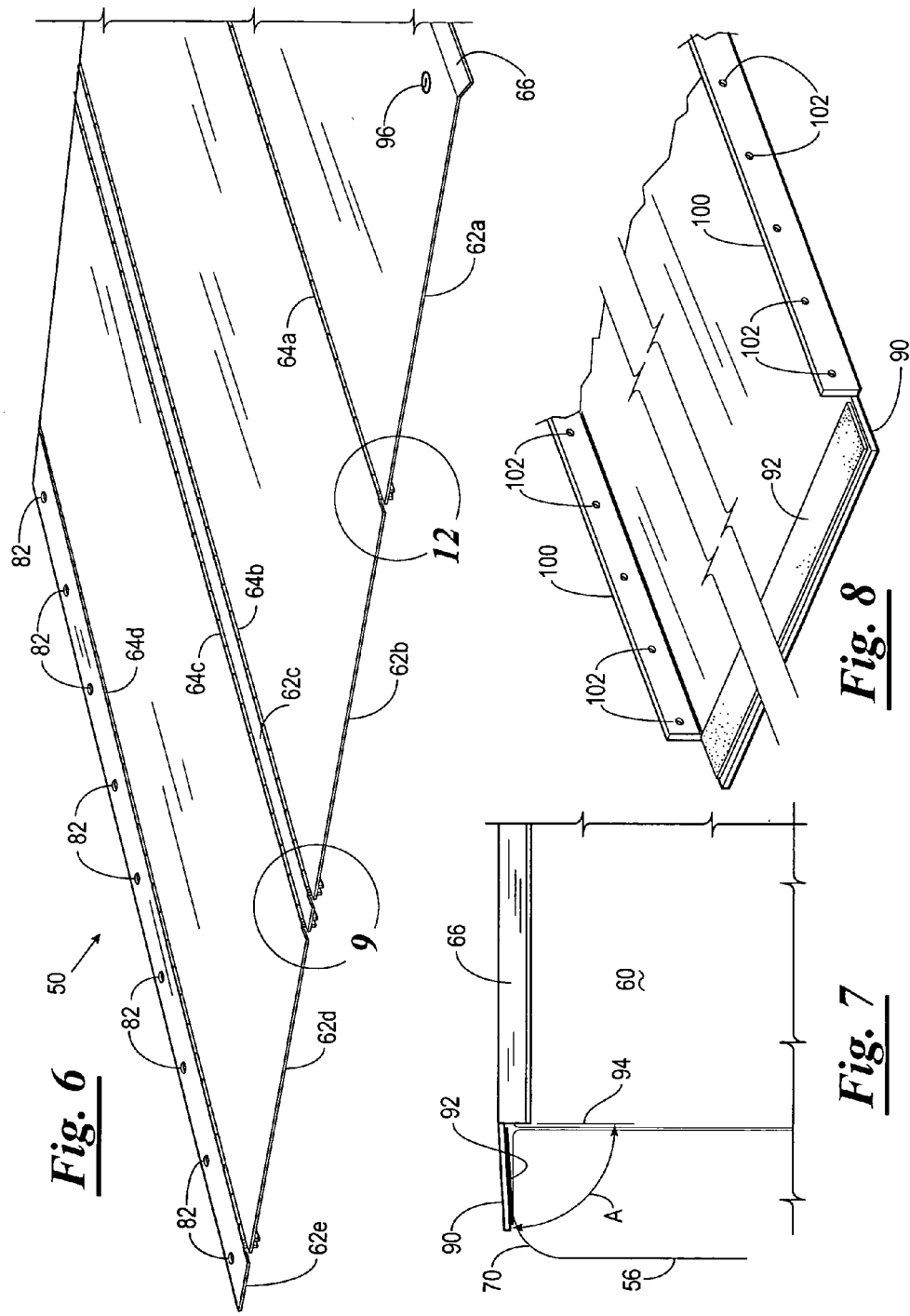

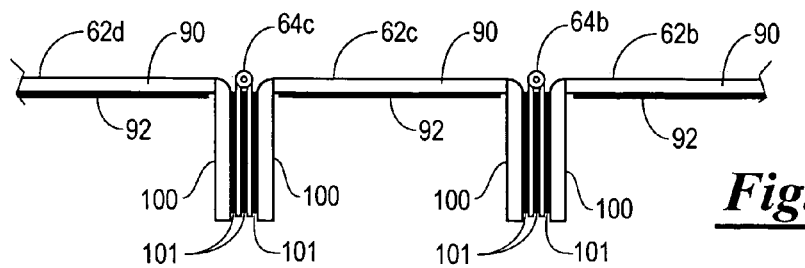
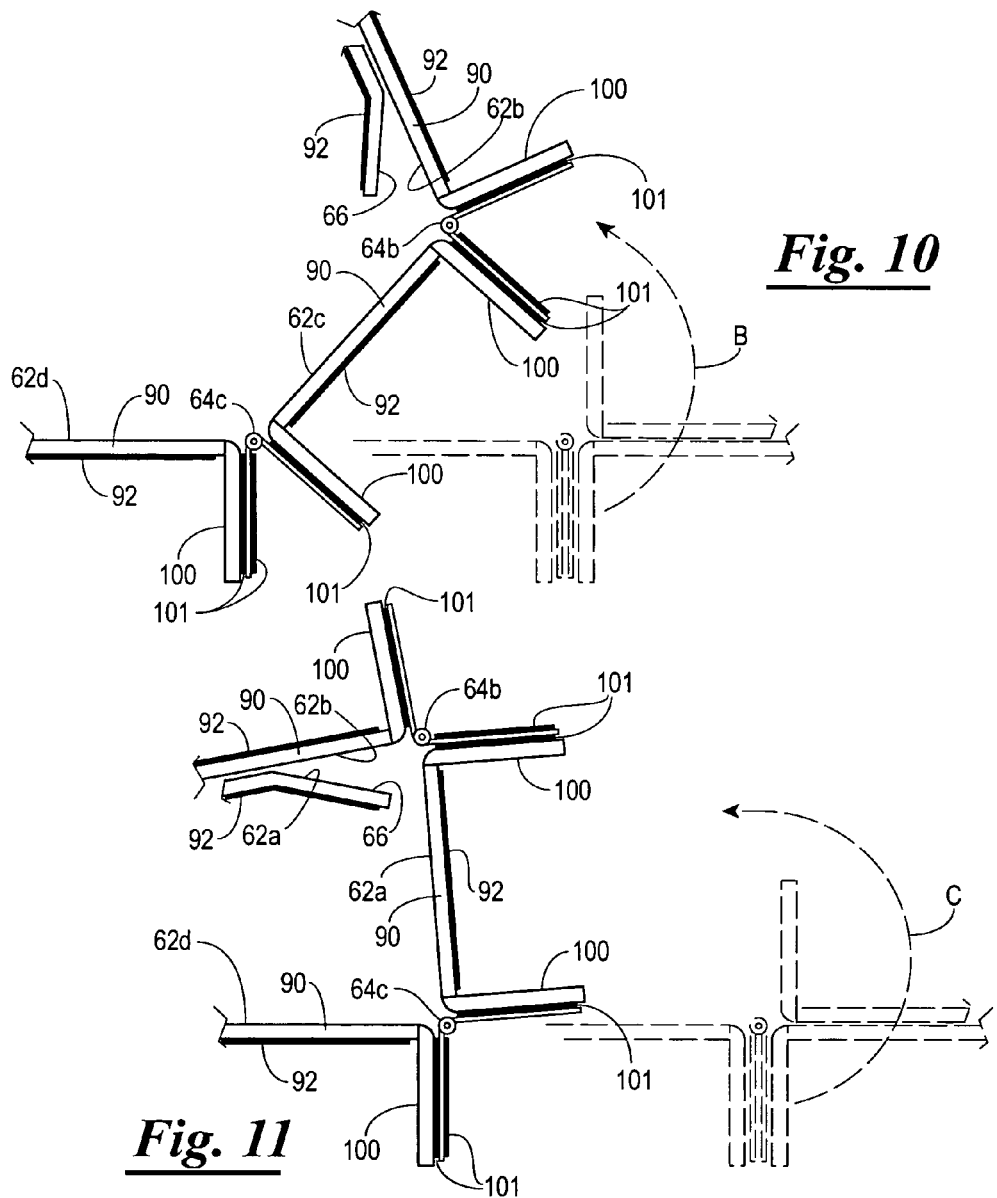
*Fig. 9*
*Fig. 10*
*Fig. 11*

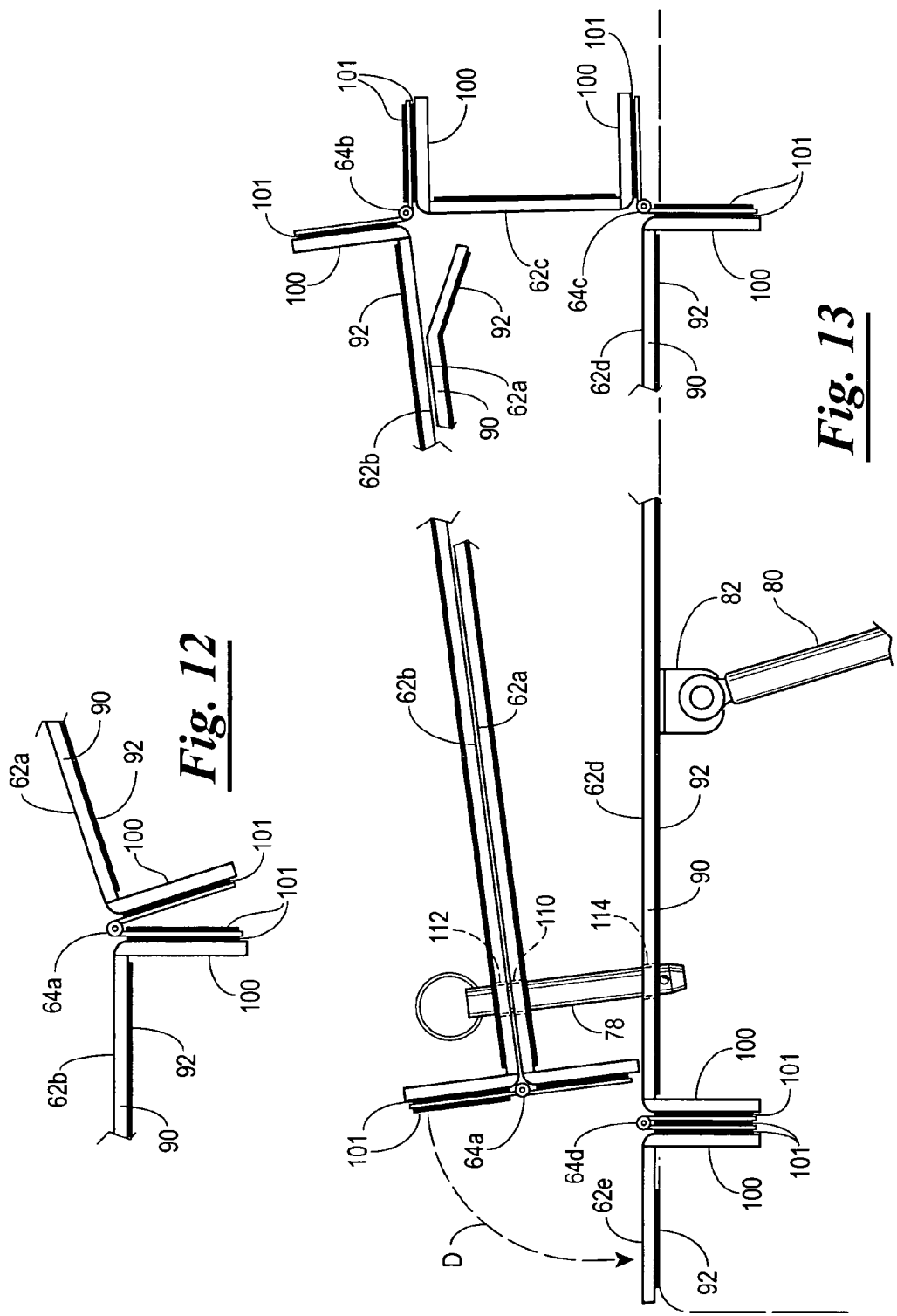

PICKUP BED COVER

BACKGROUND OF THE INVENTION

1. Field of the Invention

This invention relates to pickup bed covers and the like and, more particularly, to a multi-section folding pickup bed cover which is capable of being partially opened to permit use of some or all of the pickup bed. The cover is sufficiently rigid to support at least 100 pounds on top of the cover without bending. When unfolded to cover the entire pickup bed, locks engage the rearmost stake pockets in the pickup bed side rails. The cover folds against the pickup cab to permit use of the entire pickup bed.

Pickups with open beds experience reduced fuel economy due the drag created by the tailgate and the open bed generally. Like other pickup bed covers in the prior art, the pickup bed cover according to the present invention improves fuel economy.

2. Discussion

Pickup trucks are used for business and pleasure. Trucks may haul merchandise during business hours and camping equipment on weekends. It is sometimes necessary to transport cargo under cover, while at the same time transporting cargo which extends upward past the side rails of the pickup bed.

In the prior art, pickup beds have been covered by a tonneau type cover which is formed of cloth or synthetic material and attached to the sidewall of the pickup bed by snaps. The tonneau type cover can be rolled up in the manner of a window blind or folded into a series of pleats. The tonneau type cover, although widely used, can be easily removed and does not prevent access to the bed. Moreover, installation of the tonneau cover requires drilling of the sidewall for installation of the snaps. The tonneau type cover is not capable of supporting substantial weight on top of the cover.

U.S. Pat. No. 4,252,362, Campbell, discloses a pickup bed cover characterized by a multi-channeled track having a first pair of parallel rails leading out of a storage area horizontally along the ends thereof down to the floor of the bed. A rollable or otherwise storable fabric or slatted canopy is drawn from the storage area across the parallel rails. The storage area uses valuable cargo space, and the fabric cover cannot support substantial weight.

The pickup bed cover of the present invention provides secure storage area and improved fuel economy when deployed in a position to fully cover the pickup bed. In addition, the pickup bed cover of the present invention provides the convenience of use of some or all of the pickup bed for transporting cargo which does not fit in the fully covered bed.

SUMMARY OF THE INVENTION

A cover for the bed of a pickup truck provides a front rigid panel fastened to the front wall of the pickup bed, at least one intermediate rigid panel attached to the front rigid panel by a first transverse hinge, and a rear rigid panel attached to the intermediate rigid panel by a second transverse hinge. The rear rigid panel has a tailgate locking lip flaring downwardly and outwardly to prevent the tailgate from opening. In the fully covering position, the pickup bed cover provides a water-resistant, locked cargo area. In the partially covering position, the rear rigid panel and, optionally, the intermediate rigid panel fold forward to permit access to the cargo bed.

An object of the present invention is to provide a pickup bed cover which can be folded forward toward the cap to provide either partial or full access to the pickup bed.

Yet another object of the present invention is to provide a pickup bed cover whose rigid panels will support at least 100 pounds without bending or deforming.

Other objects, features, and advantages of the present invention will become clear from the following description of the preferred embodiment when read in conjunction with the accompanying drawings and appended claims.

BRIEF DESCRIPTION OF THE DRAWINGS

FIG. 6 is an enlarged view of the pickup bed cover shown in FIGS. 1–5.

FIG. 7 is a detailed view of the pickup bed cover shown in FIGS. 1–5, wherein a lateral extension of the pickup bed cover is shown in conjunction with the pickup rail and a locking lip portion of the pickup bed cover extends downwardly to the rear of the tailgate.

FIG. 8 is a view, partially cut away, of the underside of a section of the pickup bed cover shown in FIGS. 1–5.

FIG. 9 is an enlarged side view of a double hinge panel shown in FIG. 6.

FIG. 10 is another view of the double hinge panel shown in FIGS. 6 and 9 illustrating the folding of the rear section and the intermediate section forward across the front section.

FIG. 11 is another view of the double hinge panel shown in FIGS. 6, 9, and 10 further illustrating the folding of the rear section and the intermediate section forward across the front section.

FIG. 12 is side view showing the attachment of the rear section to the intermediate section in FIG. 6.

FIG. 13 is a detailed enlarged view of the pickup bed cover shown in FIG. 4.

DETAILED DESCRIPTION OF THE INVENTION

In the following description of the invention, like numerals and characters designate like elements throughout the figures of the drawings.

Figure 1:
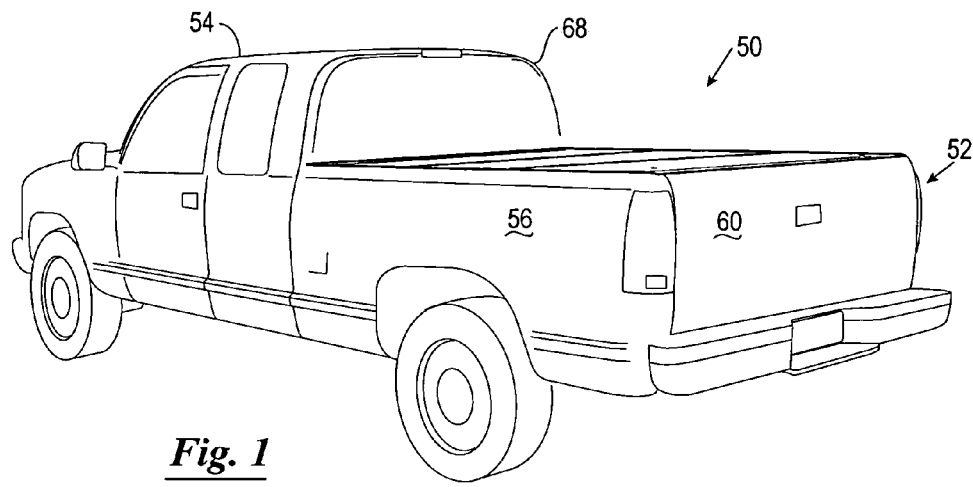
FIG. 1 is a view of applicant's pickup bed cover according to the present invention installed on a short-bed pickup.
Figure 2:
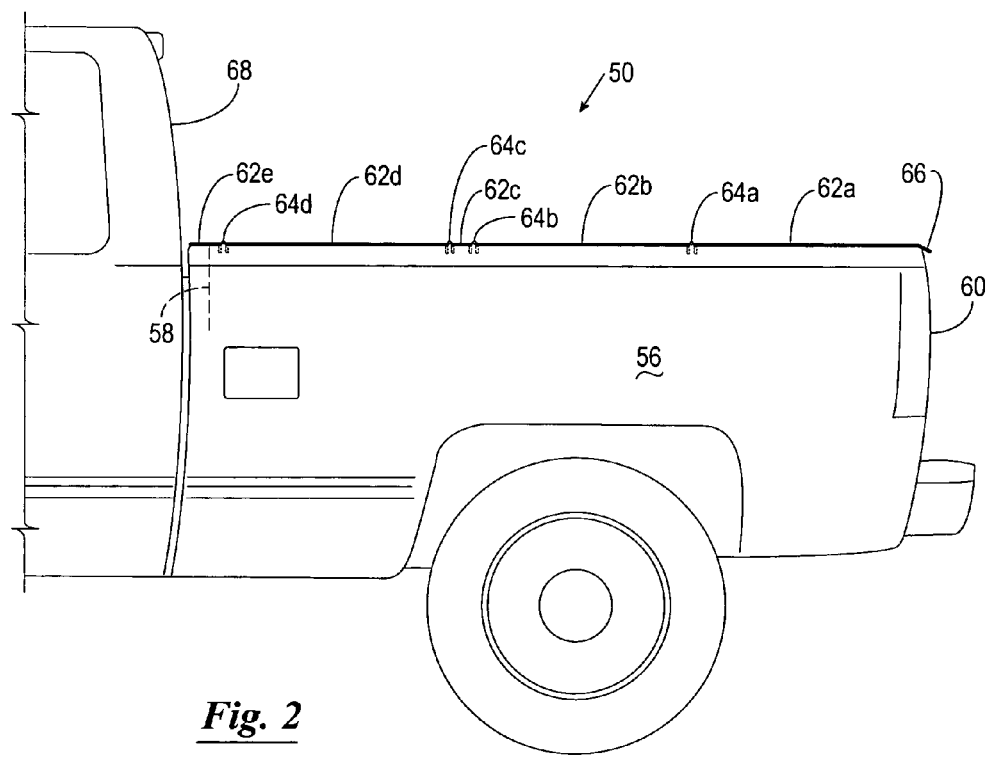
FIG. 2 is a side view of the pickup bed cover shown in FIG. 1.

Referring generally to the drawings and more particularly to FIGS. 1 and 2, a folding pickup bed cover 50 in accordance with the present invention covers the bed 52 of a pickup 54. The bed 52 of the pickup truck includes sidewalls 56, a front wall 58, and a rear wall 60. The rear wall 60 is a tailgate.

The pickup bed cover 50 is formed by substantially rigid panels 62a, 62b, 62c, 62d, and 62e which extend transversely across the pickup truck bed 52. The rigid panels are also referred to herein as rigid sections. The rigid panels are hinged together by hinges 64a, 64b, 64c, and 64d. The rearmost rigid panel 62a includes a tailgate locking lip 66 which flares downwardly and outwardly along the tailgate 60 to prevent the tailgate 60 from opening when the cover 50 is locked in the closed position illustrated in FIGS. 1 and 2. The frontmost rigid panel 62e is attached to the front wall 58 of the pickup bed 52 adjacent the cab 68 (See FIG. 6). The rigid panels can be formed from aluminum, stainless steel, or other suitable material. The rigid panel 62c is sometimes referred to as a double-hinge panel.

Figure 3:
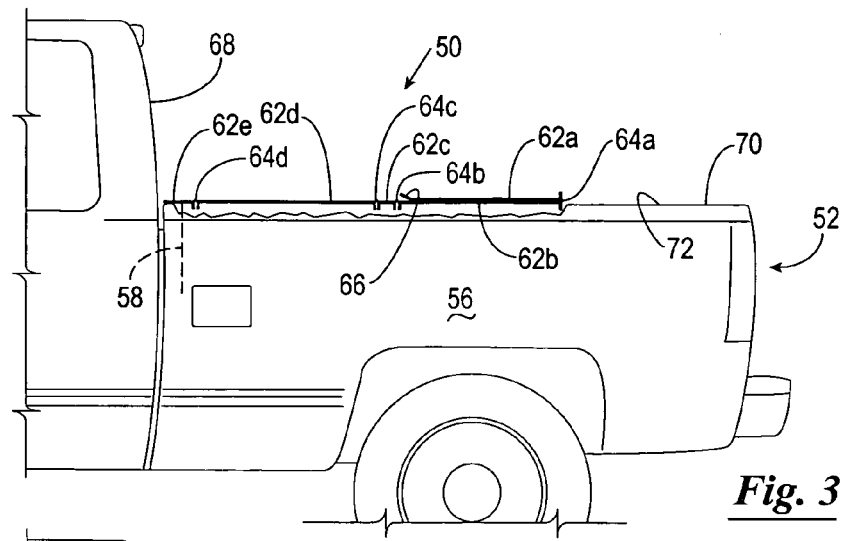
FIG. 3 is a side view of the pickup bed cover shown in FIG. 1 wherein a rear section of the pickup bed cover has been folded forward across an intermediate section to permit access to the portion of the pickup bed near the tailgate.
Figure 4:
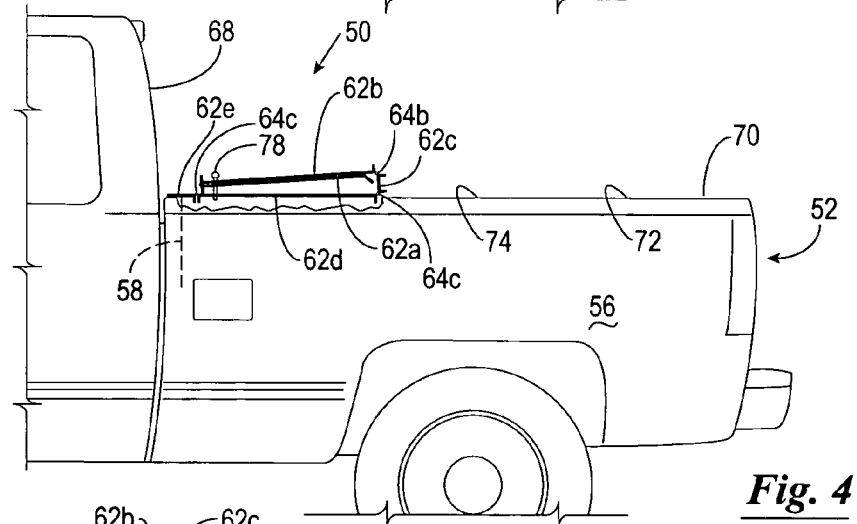
FIG. 4 is a side view of the pickup bed cover shown in FIG. 1 wherein the rear section and the intermediate section have been folded forward across a front section to permit access to the rearmost approximately two-thirds of the pickup bed.
Figure 5:
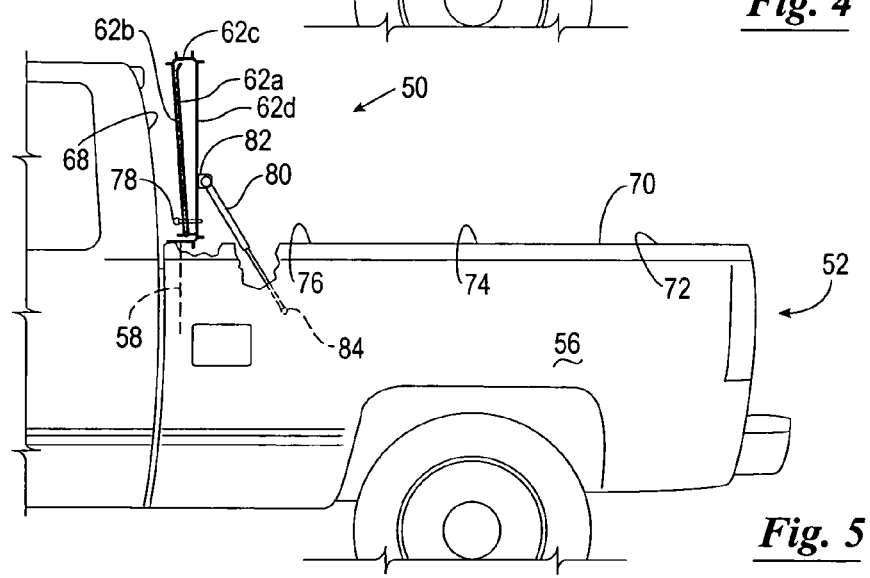
FIG. 5 is a side view of the pickup bed cover shown in FIG. 1 wherein the rear section, the intermediate section, and the front section have been folded forward against the back of the cab to permit access to the entire pickup bed.

Referring now to FIGS. 3–5, the pickup bed cover 50 is shown in progressively folded configurations. In FIG. 3, the rearmost rigid panel 62a is folded along the hinge 64a so the rigid panel 62a rests atop the rigid panel 62b and the top rear portion of the left side rail 70 of the sidewall 56 is exposed. With rigid panel 62a folded over rigid panel 62b, a rear portion 72 of the pickup bed 52 is open. The folding of rigid panel 62a over rigid panel 62b along the hinge 64a is shown in detail in FIG. 12.

Referring now to FIG. 4, the pickup bed cover 50 is folded along hinges 64b and 64c so the rearmost rigid panel is disposed between the rigid panel 62b and the rigid panel 62d. The rigid panel 62c is substantially vertical. With the rigid panels 62a, 62b, and 62c folded forward as shown in FIG. 4, both the rear portion 72 and the intermediate portion 74 of the pickup bed 52 are accessible. The folded configuration of the pickup bed cover 50 as represented by FIG. 4 is shown in detail in FIG. 13.

Referring now to FIG. 5, the pickup bed cover 50 is folded forward once again along the hinge 64d so rigid panels 62a, 62b, 62c, and 62d are adjacent the cab 68 and supported by the frontmost rigid panel 62e. With the rigid panels 62a, 62b, 62c, and 62d folded forward as shown in FIG. 5, the rear portion 72, the intermediate portion 74, and the front portion 76 of the pickup bed 52 are accessible. The folded configuration of the pickup bed cover 50 as represented by FIG. 4 is shown in detail in FIG. 14.

Referring now to FIGS. 4 and 5, a latch pin 78 extends through mating bores in rigid panels 62a, 62b, and 62d to maintain the pancake-style stack of rigid panels in a tight bundle. As shown in FIG. 5, a support 80 is attached to a support connection 82 on rigid panel 62d and to a convenient attachment point 84 on the inside of the side rail 70. The latch pin 78 and the support 80 are shown in greater detail in FIGS. 13 and 14.

Referring now to FIG. 6, the rearmost rigid panel 62a is foldably attached to the rigid panel 62b by the hinge 64a. The rigid panel 62b is foldably attached to the rigid panel 62c by the hinge 64b. The rigid panel 62c is foldably attached to the rigid panel 62d by the hinge 64c. The rigid panel 62d is foldably attached to the rigid panel 62e by the hinge 64c. The rigid panel 64e includes bores 82. The bores 82 in the frontmost rigid panel 64e permit attachment of the frontmost rigid panel 64e to the front wall 58 of the pickup bed 52. In the presently preferred embodiment, the hinges 64a, 64b, 64c, and 64d are of the type commonly referred to as piano hinges. A rotary lock 96 secures each corner of the rearmost rigid panel 62a to the rear stake pocket in each side rail 70.

Referring now to FIG. 7, each rigid panel 62a, 62b, 62c, 62d, and 62e includes, on each side where the panel contacts the side wall 56, a lateral extension 90. The lateral extension 90 extends outwardly across the side rail 70 of the side wall 56. A lateral extension seal 92 extends along the length of each side rail 70 beneath the lateral extension 90 of each rigid panel. The lateral extension seal 92 prevents rubbing of the lateral extension 90 against the side rails 70, deters water and other substances from entering the pickup bed 52 when the cover 50 is deployed as illustrated in FIGS. 1 and 2, and contributes to sound reduction. The lateral extension 90 flares downwardly from the main portion of the rigid panel to form an angle A of about 87 degrees with respect to a vertical reference line 94.

Referring now to FIG. 8, each rigid panel 62a, 62b, 62c, 62d, and 62e includes at least one hinge lip 100 for attachment of the hinges to adjacent rigid panels. The hinge lip 100 includes a series of bores 102 for attachment of the piano hinges.

Referring now to FIGS. 9–11, the lip 100 of rigid panel 62b is attached to one lip 100 of rigid panel 62c by hinge 64b. A hinge seal 101 is disposed between the lip 100 of the rigid panel 62b and the adjacent hinge element of the hinge 64b. Another hinge seal 101 is disposed between the lip 100 of the rigid panel 62c and the adjacent hinge element of the hinge 64b. Another hinge seal 101 is adhesively attached to one of the hinge elements of the hinge 64b so as to provide a seal between the hinge elements. A second lip 100 of the rigid panel 62c is attached to a lip 100 of the adjacent rigid panel 62d by the hinge 64c. Three hinge seals 101 promote water resistance and reduce vibration and noise.

In FIG. 9, the pickup bed cover 50 is shown in a horizontal position, i.e., wherein the pickup bed cover 50 covers the bed entirely as shown in FIGS. 1, 2, and 6.

In FIG. 10, the pickup bed cover 50 is shown in an intermediate position between the configuration shown in FIG. 2 and the configuration shown in FIG. 4. An arrow B shows the direction of folding of the rigid panel 62b in counterclockwise fashion at the hinge 64b. An arrow C shows the direction of folding of the rigid panel 62c in counterclockwise fashion at the hinge 64c.

In FIG. 11, the rigid panels 62a and 62b are lying generally horizontally across the rigid panel 62d. Rigid panel 62c, which is hingedly connected between rigid panel 62b and rigid panel 62b is in a substantially vertical position.

Referring now to FIG. 12, the rigid panel 62a folds across rigid panel 62b at hinge 64a to accomplish a change from the configuration shown in FIG. 2 to the configuration shown in FIG. 3.

In FIG. 13, the pickup bed cover 50 according to the present invention is configured as shown in FIG. 4. The latch pin 78 is disposed through mating bores 110, 112, and 114 in rigid panels 62a, 62b, and 62d, respectively. When the latch pin 78 is in place as shown in FIG. 13, the rigid panels 62a, 62b, 62c, and 62d are fixedly attached and move together along arrow D to achieve the configuration shown in FIGS. 5 and 14. As the rigid panel 62d folds upwardly at the hinge 64d, the support 80 extends and further stabilizes the pickup bed cover 50 in a vertical position against the cab 68 (See FIGS. 5 and 14).

It will be understood by one skilled in the art that the support 80 can be pneumatic, hydraulic, or mechanical. Pneumatic and hydraulic supports are well known in the art for hatchbacks, trunks, and hoods of various vehicles.

Because they are well known in the art, it is not necessary to explain their operation except as it relates to the present invention.

Figure 14:
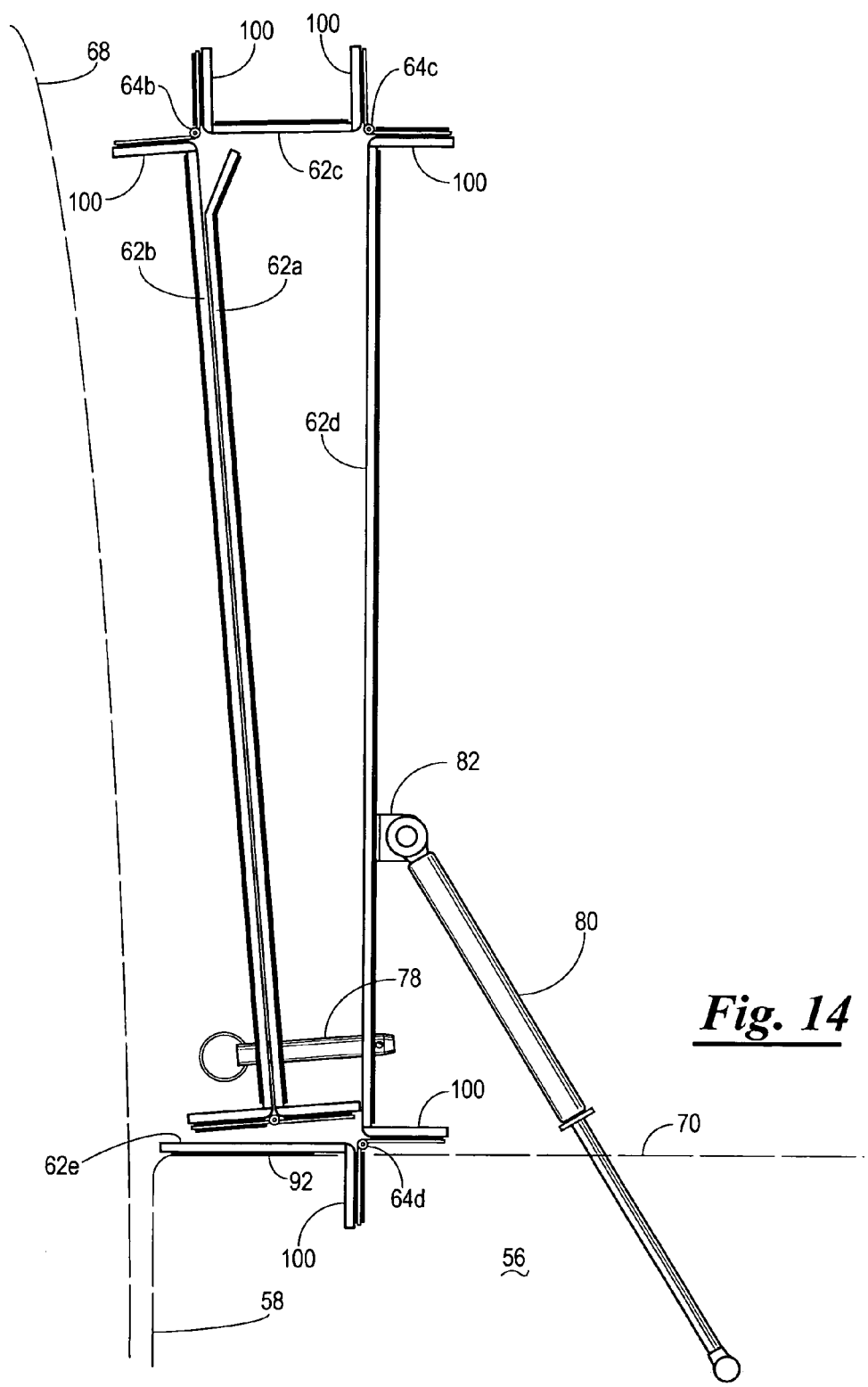
FIG. 14 is a detailed enlarged view of the pickup bed cover shown in FIG. 5.

Referring now to FIG. 14, the pickup bed cover 50 is shown in a fully folded position as in FIG. 5. The latch pin 78 holds rigid panels 62a, 62b, 62c, and 62d in fixed relationship. The support 80 holds the combination of panels 62a, 62b, 62c, and 62d in an essentially vertical position against the cab 58 of the pickup 54.

Figure 15:
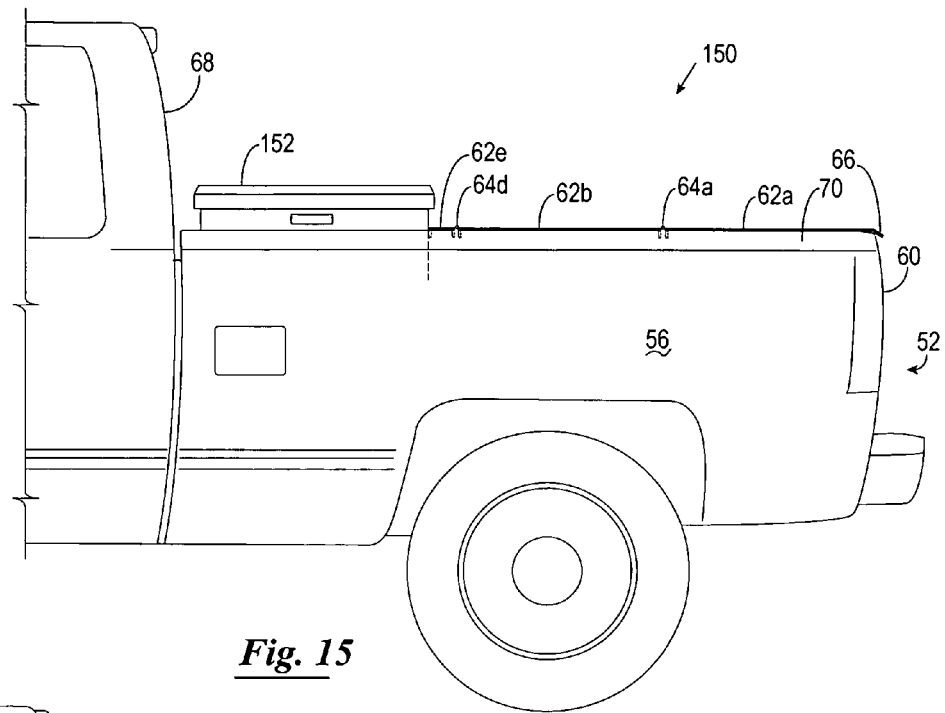
FIG. 15 is a view of a pickup bed cover according to the present invention used in conjunction with a tool box in a short-bed pickup.

Referring now to FIG. 15, a shorter pickup bed cover 150 is shown covering a portion of a pickup bed 52 wherein a toolbox 152 has been mounted. The rear rigid panel 62a folds across the rigid panel 62d. The combination of rigid panels 62a and 62d, held in fixed relationship by a latch pin 78 (See FIGS. 4, 5, 13, and 14), then swings counterclockwise around the hinge 64d to a vertical position behind the tool box 152.

Figure 16:
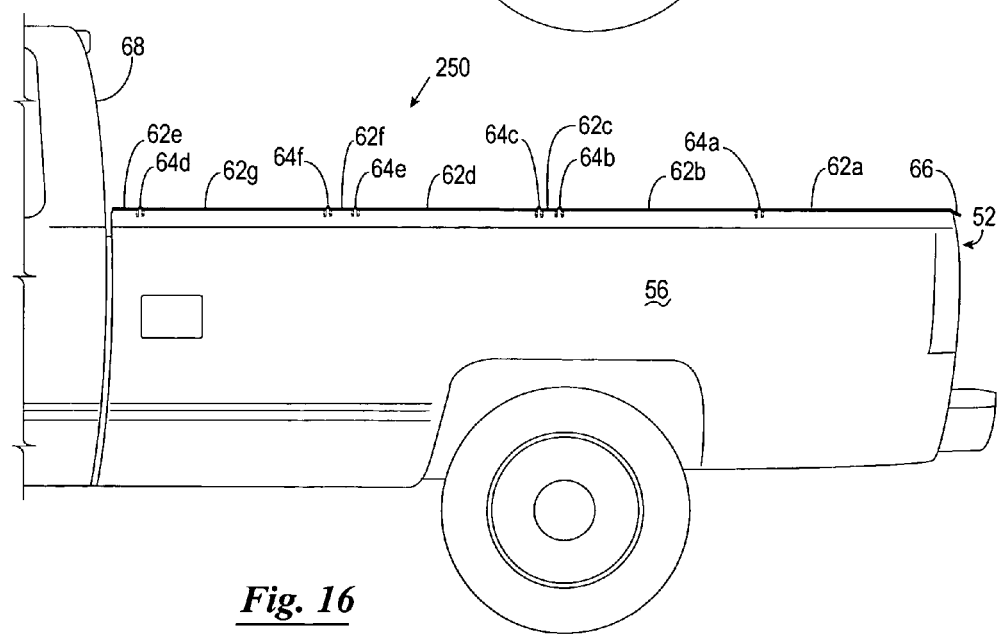
FIG. 16 is a view of a pickup bed cover according to the present invention installed on a long-bed pickup.

Referring now to FIG. 16, a pickup bed cover 250 according to the present invention is formed by substantially rigid panels 62a, 62b, 62c, 62d, 62e, 62f, and 62g which extend transversely across the pickup truck bed 52. The rigid panels are hinged together by hinges 64a, 64b, 64c, 64d, 64e, and 64f. The rearmost rigid panel 62a includes a tailgate locking lip 66 which flares downwardly and outwardly along the tailgate 60 to prevent the tailgate 60 from opening when the cover 250 is locked in the closed position illustrated in FIGS. 1 and 2. The frontmost rigid panel 62e is attached to the front wall 58 of the pickup bed 52 adjacent the cab 68 (See FIG. 6). The rigid panel 62f is a second double-hinge panel. Like double-hinge panel 62c, the double-hinge panel 62f accommodates folding of multiple layers of rigid panels in pancake fashion.

According to the present invention, the only alterations to the pickup bed 52 are the holes in the front wall 58 for attachment of the front rigid panel 62e, together with a point of attachment of the support 80 in one side wall 56.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A cover for a bed of a pickup truck having the bed with a pair of generally parallel, spaced-apart, upstanding sidewalls, a tailgate extending between the sidewalls at the rear, a front wall extending between the sidewalls at an end opposite the tailgate adjacent a cab of a pickup, the sidewalls, tailgate, and front wall defining a pickup truck bed, the pickup bed cover comprising:

a front rigid panel fastened to the front wall of the pickup bed;

at least one intermediate rigid panel attached to said front rigid panel by a first transverse hinge; and a rear rigid panel attached to said intermediate rigid panel by a second transverse hinge, said rear rigid panel having a tailgate locking lip flaring downwardly and outwardly to prevent the tailgate from opening;

wherein said front rigid panel, said intermediate rigid panel, and said rear rigid panel cooperate to cover the pickup bed in a fully covering position, wherein said rear rigid panel folds across said intermediate rigid panel at said second transverse hinge so that said tailgate locking lip of said rear rigid panel rests against said intermediate rigid panel to cover the pickup bed partially in a partially covering position, and wherein said intermediate rigid panel and said rear rigid panel remaining folded to said intermediate panel, fold upward along said first transverse hinge so that said intermediate rigid panel and said rear rigid panel reside in an essentially vertical position in an open position.

2. The device of claim 1 wherein said front rigid panel, said intermediate rigid panel, and said rear rigid panel have lateral extensions which extend outwardly across the sidewalls of the pickup bed and thereby support said rigid panels on the sidewalls.

3. The device of claim 2, further comprising lateral extensions seals disposed between each said lateral extension of said rigid panels and the respective sidewall of the pickup bed.

4. The device of claim 1, wherein said first transverse hinge is a piano hinge.

5. The device of claim 4 wherein said second transverse hinge is a piano hinge.

6. The device of claim 5 wherein adjacent ones of said rigid panels have mating downwardly-directed transverse lips and said first and second transverse hinges are attached to said downwardly-directed lips.

* * * * *